United States Patent
Zhuang et al.

(10) Patent No.: US 7,620,787 B2
(45) Date of Patent: Nov. 17, 2009

(54) OPTIMIZING MEMORY ACCESSES FOR NETWORK APPLICATIONS USING INDEXED REGISTER FILES

(75) Inventors: Jiangang Zhuang, Fujian (CN); Jinquan Dai, Shanghai (CN); Long Li, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 489 days.

(21) Appl. No.: 10/581,154

(22) PCT Filed: Jan. 26, 2006

(86) PCT No.: PCT/CN2006/000163
§ 371 (c)(1), (2), (4) Date: May 31, 2006

(87) PCT Pub. No.: WO2007/085122
PCT Pub. Date: Aug. 2, 2007

(65) Prior Publication Data
US 2008/0288737 A1    Nov. 20, 2008

(51) Int. Cl.
*G06F 13/14* (2006.01)

(52) U.S. Cl. .................. 711/165; 711/147; 712/204

(58) Field of Classification Search ............. 711/165; 712/204
See application file for complete search history.

(56) References Cited

U.S. PATENT DOCUMENTS 5,481,708 A * 1/1996 Kukol .............. 717/155
2004/0015904 A1  1/2004 Jourdan et al.

FOREIGN PATENT DOCUMENTS

| CN | 1549963 A | 11/2004 |
| CN | 1577295 A | 2/2005 |

OTHER PUBLICATIONS

Notification of Transmittal of International Search Report, International Application No. PCT/CN2006/000163, Nov. 16, 2006.
Notification Concerning Transmittal of International Preliminary Report on Patentability, Mailed Aug. 7, 2008, PCT/CN2006/000163, 5 pages.

* cited by examiner

*Primary Examiner*—Hetul Patel
(74) *Attorney, Agent, or Firm*—Blakely, Sokoloff, Taylor & Zafman LLP

(57) ABSTRACT

A processing device includes an optimizer to migrate objects from an external memory of a network processing to local memory device to registers connected to a processor. The optimizer further aligns and eliminates redundant unitialization code of the objects.

17 Claims, 7 Drawing Sheets

(BASE + OFFSET) == (BASE | OFFSET)
Fig. 1
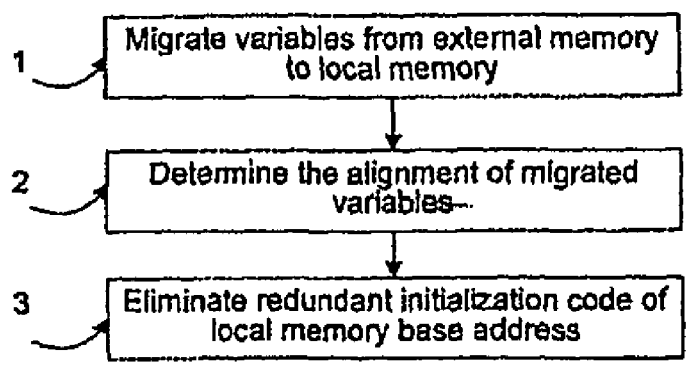
Fig. 2
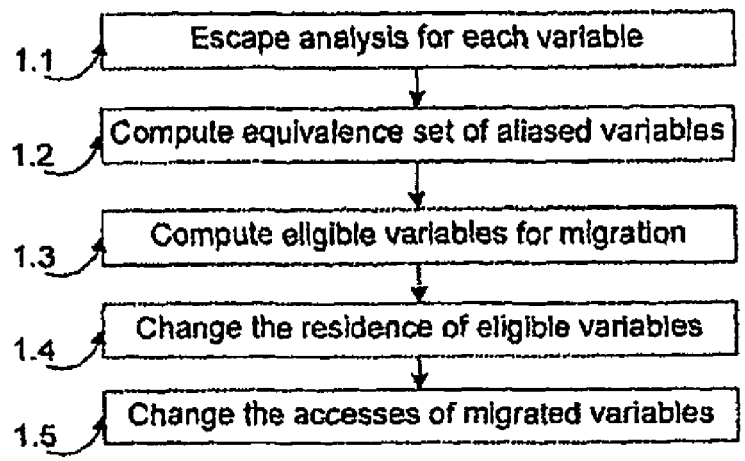
Fig. 3

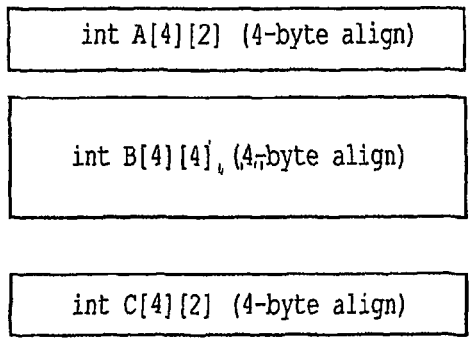

1 Access Address A[i][0]
2 Access Address A[i][1]
3 Access Address B[i][0]
4 Access Address B[i][1]
5 Access Address B[i][2]
6 Access Address B[i][3]
7 Access Address A[i][0]
8 Access Address A[i][1]

Original Data

Pseudo code sequence of accessing A, B, C

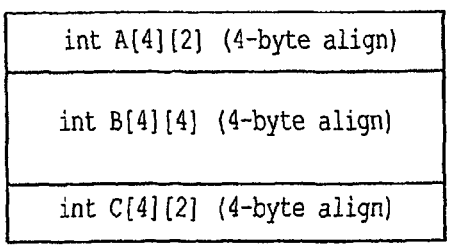

Data in local memory

FIG. 5A

Set the base address to A[i][0]
Access Address A[i][0] (A[i][0]+0)
Set the base address to A[i][1]
Access Address A[i][1] (A[i][1]+0)
Set the base address to B[i][0]
Access Address B[i][0] (B[i][0]+0)
Set the base address to B[i][1]
Access Address B[i][1] (B[i][1]+0)
Set the base address to B[i][2]
Access Address B[i][2] (B[i][2]+0)
Set the base address to B[i][3]
Access Address B[i][3] (B[i][3]+0)
Set the base address to C[i][0]
Access Address C[i][0] (C[i][0]+0)
Set the base address to C[i][1]
Access Address C[i][1] (C[i][1]+0)

Pseudo code sequence of
accessing A, B, C with
initialization code of local
memory based address inserted

FIG. 5B

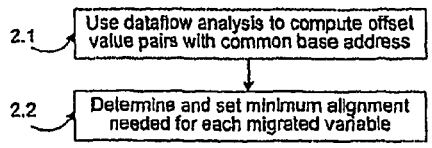

Fig. 6

Compute the GEN, KILL, IN, and OUT for each flow node, fill in the hash table {base address, set of offset value pair}
for (each base address in the hash table)
   VAR is the variable accessed by the base address
   for (each offset value pair for this base address)
      int CURR_VAR_ALIGN = current alignment of VAR
      int CURR_BASE_ALIGN = current alignment of the base address
      if (CURR_BASE_ALIGN does not satisfy the condition in Figure 1 for one of the offset value in the pair)
         int NEEDED_BASE_ALIGN = the minimum base address alignment needed to satisfy the condition in Figure 1 for all offset values in the pair
         int new_align = CURR_VAR_ALIGN * NEEDED_BASE_ALIGN / CURR_BASE_ALIGN
         if (new_align <= MAX_ALIGN(VAR))
            set the alignment of VAR to new_align
            if (the alignment change does not make the base address satisfy the condition in Figure 1 for all offset values in the pair)
                restore VAR's alignment to CURR_VAR_ALIGN
         end if
      end if
   end if

Fig. 7

| int A[4][2] (8-byte align) |
|---|
| int B[4][4] (16-byte align) |
| int C[4][2] (8-byte align) |

Data with adjusted alignment

FIG. 8A

Set the base address to A[i][0]
Access Address A[i][0]  (A[i][0]+0)
Set the base address to A[i][0]
Access Address A[i][1]  (A[i][0]+4)
Set the base address to B[i][0]
Access Address B[i][0]  (B[i][0]+0)
Set the base address to B[i][0]
Access Address B[i][1]  (B[i][0]+4)
Set the base address to B[i][0]
Access Address B[i][2]  (B[i][0]+8)
Set the base address to B[i][0]
Access Address B[i][3]  (B[i][0]+12)
Set the base address to C[i][0]
Access Address C[i][0]  (C[i][0]+0)
Set the base address to C[i][0]
Access Address C[i][1]  (C[i][0]+4)

Pseudo code sequence of accessing A, B, C
after insert code to initialize the
local memory base address

FIG. 8B

| int A[4][2] (8-byte align) |
|---|
| int B[4][4] (16-byte align) |
| int C[4][2] (8-byte align) |

Data with adjusted alignment

FIG. 9A

Set the base address to A[i][0]
Access Address A[i][0]  (A[i][0]+0)
Access Address A[i][1]  (A[i][0]+4)
Set the base address to B[i][0]
Access Address B[i][0]  (B[i][0]+0)
Access Address B[i][1]  (B[i][0]+4)
Access Address B[i][2]  (B[i][0]+8)
Access Address B[i][3]  (B[i][0]+12)
Set the base address to C[i][0]
Access Address C[i][0]  (C[i][0]+0)
Access Address C[i][1]  (C[i][0]+4)

Pseudo code sequence of accessing A, B, C
after insert code to initialize the
local memory base address

FIG. 9B

OPTIMIZING MEMORY ACCESSES FOR NETWORK APPLICATIONS USING INDEXED REGISTER FILES

CROSS-REFERENCE TO RELATED APPLICATION

This application is a National Phase application of, and claims priority to, International Application No. PCT/CN2006/000163, filed Jan. 26, 2006, entitled OPTIMIZING MEMORY ACCESSES FOR NETWORK APPLICATIONS USING INDEXED REGISTER FILES

BACKGROUND

1. Field

The embodiments relate to high-speed network devices, and more particularly to optimizing memory access for high-speed network devices.

2. Description of the Related Art

Synchronous optical network (SONET) is a standard for optical telecommunications transport formulated by the Exchange Carriers Standards Association (ECSA) for the American National Standards Institute (ANSI), which sets industry standards in the U.S. for telecommunications and other industries. Network processors (NP) are emerging as a core element of network devices, such as high-speed communication routers. NPs are designed specifically for network processing applications.

The unique challenge of network processing is to guarantee and sustain throughput for the worst-case traffic. For instance, the case of the optical level OC-192 (10 Gigabits/sec) POS (Packet over SONET) packet processing presents significant processing and throughput challenges. It requires a throughput of 28 million packets per second or service time of 4.57 microseconds per packet for processing in the worst case. The latency for a single external memory access is much larger than the worst-case service time.

Therefore, modern network processors usually have a highly parallel architecture with non-uniform memory hierarchy. Network processors can consist of multiple microengines (MEs, or programmable processors with packet processing capability) running in parallel. Each ME has its own local memory (LM), for example registers.

Various constraints may be applied to accessing register files, which complicates the management of the register files. For example, a local memory in a NP can be addressed using a BASE-OFFSET word address. The BASE value is stored in a specific base-address register, and there is 3-cycle latency between writing the base-address register when its value changes.

The OFFSET is a constant from 0 to 15. The final address in the BASE-OFFSET mode, however, is computed using a logical OR operation (i.e., BASE|OFFSET). Therefore, to support C pointer arithmetic, e.g., pointer+offset, using the BASE-OFFSET mode of local memory where BASE=pointer and OFFSET=offset, proper alignment of BASE has to be ensured such that the condition in FIG. 1 holds. Otherwise, to access that address, the base-register has to be set to pointer+offset, and the OFFSET is set to 0. FIG. 1 illustrates the alignment requirement of the BASE-OFFSET addressing mode of the local memory.

CONTENTS OF THE INVENTION

Problem to be Solved

Current network processors (NP) have latency between writing the base-address register and when its value changes. Further latency is added when accessing external memory to the NP. Therefore, the problem is how to reduce latency with memory accesses.

Solutions

In order to improve performance for network applications, one embodiment includes an optimizing compiler to optimize and minimize external memory accesses using the local memory (i.e., indexed register files), and minimizes the initializations of the base-address register for efficient local memory accesses.

One embodiment migrates external memory objects (e.g., variables) to the local memory (i.e., indexed register files), and optimizes the accesses to the local memory by determining alignment of the migrated objects; and eliminating redundant initialization code of the objects.

The advantages of the embodied solutions is that objects that are accessed from external memory are now accessed through local memory to a network processor (e.g., indexed registers) and the latency from writing the base-address register when its value changes is reduced as redundant initializations are eliminated.

BRIEF DESCRIPTION OF THE DRAWINGS

The embodiments are illustrated by way of example, and not by way of limitation, in the figures of the accompanying drawings and in which like reference numerals refer to similar elements and in which:

FIG. 1 illustrates the alignment requirement of the BASE-OFFSET addressing mode of the local memory;

FIG. 2 illustrates a block diagram of an embodiment;

FIG. 3 illustrates a block diagram of object migration;

FIG. 4A-B illustrates original object and code sequences in external memory;

FIG. 5A-B illustrates objects migrated to local memory and access code sequence without alignment adjustment;

FIG. 6 illustrates a block diagram for determining alignment of migrated objects;

FIG. 7 illustrates pseudo-code for determining and setting the minimum alignment needed for each object;

FIG. 8A-B illustrates objects migrated to local memory and access code sequence with alignment adjusted;

FIG. 9A-B illustrates objects migrated to local memory and access code sequence with alignment adjusted and redundant initializations eliminated;

DETAILED DESCRIPTION

Figure 10:
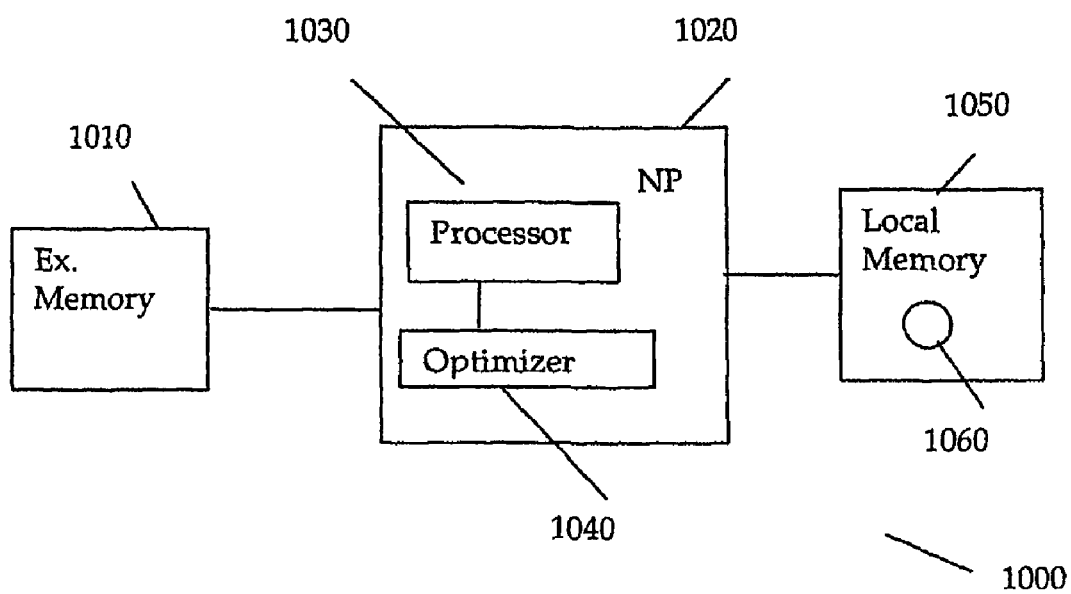
FIG. 10 illustrates an embodiment of a processing device.

The embodiments discussed herein generally relate to optimization of local memory accessing and latency reduction for network processors. Referring to the figures, exemplary embodiments will now be described. The exemplary embodiments are provided to illustrate the embodiments and should not be construed as limiting the scope of the embodiments.

FIG. 2 illustrates a general block diagram of an embodiment for optimizing an executable. In this embodiment external memory accesses are optimized using indexed register files, by efficiently migrating external memory variables to the local memory (i.e., indexed register files), and minimizing the initializations of the base-address register of the local memory. In block 1 objects that change values (e.g., variables) are migrated from an external memory, such as a main memory, such as random-access memory (RAM), static random access memory (SRAM), dynamic random access memory (DRAM), synchronous DRAM (SDRAM), read-only memory (ROM), etc., of a network processor (NP) to local memory of the NP, such as indexed registers. In block 2, alignment of the migrated objects is determined. And, in block 3 redundant initialization code of the objects is eliminated. FIG. 3 illustrates block 1 in further detail.

FIG. 3 illustrates a block diagram of object migration. In general, the blocks in FIG. 3 cover determining whether each object of the plurality of objects are accessible from a plurality of processors; determining an equivalence set of aliased objects in the plurality of objects; determining objects of the plurality of objects eligible for migration; changing residence of the objects determined to be eligible for migration; and changing accesses of the objects having their residence changed.

As illustrated in FIG. 2, first variables are migrated from external memory to local memory (i.e., indexed registers). In one embodiment, the eligible objects (i.e., variables) in external memory are migrated to the local memory. That is, the residences of those variables are changed to the local memory, and the accesses to those variables are changed correspondingly.

Since local memory resides in each NP and the local memory in one processor cannot be shared with another processor, variables that are accessed by multiple processors are not migrated to local memory. In block 1.1 it is determined whether a variable is accessed by multiple processors through escape analysis. In one embodiment, escape analysis determines whether an object (i.e., variable) is accessed by more than one processor. Consequently, variables in external memory can be migrated to indexed register files for fast accesses, no matter whether they are accessed using constant addresses or pointers (i.e., non-constant addresses).

In block 1.2 an equivalence set of aliased variables are computed through points to analysis. That is, variables that could possibly be accessed by one instruction belong to the same equivalence set. If one variable in an equivalence set cannot be migrated to local memory, none of those variables in the same equivalence set can be migrated to local memory. In one embodiment the total size of variables should not exceed the available local memory size. With the above constraints and the equivalence set, variables that are eligible for migration are computed in block 1.3.

In block 1.4, the residence of eligible variables is changed from external memory to local memory. In block 1.5, accesses of those variables whose residence were changed is changed.

For example, suppose there are three variables A, B, C in an external memory (e.g. SRAM) whose original alignment and size are illustrated in FIG. 4A. The access order is illustrated in FIG. 4B. For the access order of A, B, and C as illustrated in FIG. 4B, several I/O operations to the external memory are needed.

FIG. 5A-B illustrate data migrated to local memory and access code sequence without alignment adjustment. For ease of discussion, suppose A, B, and C satisfy the migration condition, after migrating these objects to local memory, accesses of these objects with local memory base address register initialization code inserted are illustrated in FIG. 5B. Without further optimization, none of the accesses can share the base address value because the base address and offset value do not satisfy the alignment requirement of the BASE-OFFSET mode.

FIG. 6 illustrates a block diagram of determining the alignment of migrated variables through a forward disjunctive dataflow analysis. In one embodiment, the alignments of the migrated objects are adjusted properly, such that the sharing of the base address register is maximized between the accesses to the local memory. In one embodiment, the minimum alignments required for objects in local memory to maximize sharing of base registers and to reduce padding between variables are determined. That is, the alignment of the object in local memory is determined such that, any smaller alignment causes less sharing of the base-address register, and any alignment larger than this value does not cause more sharing of the base-address address.

Block 2.1 uses a forward disjunctive dataflow analysis to compute the offset value pairs with a common base address. The dataflow analysis uses a simplified flow graph, i.e., those instructions that do not contain any accesses to migrated objects are purged off and each flow node consists of only one instruction.

In the simplified flow graph, flow nodes and instructions are the same. In one embodiment, it is assumed that each instruction contains, at most, one local memory access, and the address of the access is expressed in the form of base address+constant offset. The dataflow equations for each instruction i is shown below.

$$\begin{cases} GEN[i] = \left\{ L \mid \begin{array}{l} L \text{ is the local memory} \\ \text{base address used in instruction } i \end{array} \right\} \\ KILL[i] = \left\{ L \mid \begin{array}{l} L \text{ is the local memory} \\ \text{base address not used in instruction } i \end{array} \right\} \\ IN[i] = \bigcup_{p \in Pred(i)} OUT[p] \\ OUT[i] = GEN[i] \cup (IN[i] - KILL[i]) \end{cases}$$

The forward disjunctive dataflow analysis is iterated until both IN and OUT are converged. For the example of sequential accesses illustrated in FIG. 5B, the values of GEN and KILL for each local memory access are as follows:

GEN(1)={A[i][0]} KILL(1)={B[i][0], C[i][0]}
GEN(2)={A[i][0]} KILL(2)={B[i][0], C[i][0]}
GEN(3)={B[i][0]} KILL(3)={A[i][0], C[i][0]}
GEN(4)={B[i][0]} KILL(4)={A[i][0], C[i][0]}
GEN(5)={B[i][0]} KILL(5)={A[i][0], C[i][0]}
GEN(6)={B[i][0]} KILL(6)={A[i][0], C[i][0]}
GEN(7)={C[i][0]} KILL(7)={A[i][0], B[i][0]}
GEN(8)={C[i][0]} KILL(8)={A[i][0], B[i][0]}
The final values of IN and OUT are as follows:
IN(1)={ } OUT(1)={A[i][0]}
IN(2)={A[i][0]} OUT(2)={A[i][0]}
IN(3)={A[i][0]} OUT(3)={B[i][0]}

IN(4)={B[i][0]} OUT(4)={B[i][0]}
IN(5)={B[i][0]} OUT(5)={B[i][0]}
IN(6)={B[i][0]} OUT(6)={B[i][0]}
IN(7)={B[i][0]} OUT(7)={C[i][0]}
IN(8)={C[i][0]} OUT(8)={C[i][0]}

In one embodiment, each base address in GEN[i]∩IN[i] is used by two consecutive local memory accesses to the same object, with possibly different (constant) offsets. In one embodiment, if the base address and one of the constant offsets do not satisfy the requirement in FIG. 1, the sharing of the base address is not possible. In this case, one embodiment of an optimizer (e.g., compiler) can enlarge the alignment to the objects so that the base address and offset values can meet the alignment requirement.

In one embodiment, the pair of two different offset values (offset value pair) of the two consecutive local memory accesses that use the same base address can be computed during the dataflow iteration. That is, when calculating the IN set for flow node i, if GEN[i]∩IN[i] is found not to be empty, the different offset values of the current and previous local memory accesses (that use the same base address) are recorded as a pair of offset values (associated with the base address). In the above example, the list of offset value pairs associated with the base address is shown below.

A[i][0]->{(0,4)}
B[i][0]->{(0,4), (4,8), (8,12)}
C[i][0]->{(0,4)}

For each base address, assume VAR is a variable accessed by this base address and its size is SIZE; then the upper bound of the alignment to be attempted for VAR, or MAX_ALIGN (VAR), can be determined as follows. Here the MAX_ALIGN is the width (in bytes) of the OFFSET in the BASE-OFFSET addressing mode (for instance, 64 for the local memory in a NP).

$$MAX\_ALIGN(VAR) = \min(MAX\_ALIGN, 2^{\lceil \log_2 SIZE \rceil})$$

FIG. 7 illustrates pseudo code of block 2.2 that determines and sets the minimum alignment needed for each object (i.e., variable) in local memory. In one embodiment, with the pseudo-code in FIG. 7, the alignment of the objects can be properly set so that two consecutive accesses of the same variable can use the same base address value, thus reducing the number of base address register initialization instructions. According to the definition of the minimum alignment and the pseudo-code illustrated in FIG. 7, the minimum alignments of A, B, C are set to 8, 16 and 8 bytes, respectively. With the adjusted alignment, the data in local memory and access code sequence are illustrated in FIG. 8A-B.

The result of block 2.2 (illustrated in FIG. 6) could contain some redundant initializations of the base address register. In one embodiment, those redundant initializations are eliminated using any existing (partial) redundancy elimination algorithms. After the redundant initialization code elimination, the data in local memory and the access code sequence is illustrated in FIG. 9A-B, in which the initialization instructions are greatly reduced.

FIG. 10 illustrates a processing device 1000. Processing device 1000 includes a processing device (e.g., a NP) 1020 connected to external memory 1010 (e.g., SDRAM). Processing device 1000 further includes optimizer 1040 that is coupled to processor 1030. Further included are indexed registers 1050 coupled to processing device 1020. As illustrated, objects 1060 currently reside in indexed registers 1060 after being migrated from external memory 1010. Optimizer 1040 minimizes external memory 1010 accesses by migrating objects 1060 (e.g., variables) in external memory to indexed registers 1050 (e.g., the local memory on processing device 1020). That is, changing the residence of those objects to indexed registers 1050 and the accesses to those objects. Consequently, external memory 1010 access latency is minimized for network applications. In one embodiment, processing device 1000 is a high-speed networking router. On another embodiment, multiple processing devices 1020 are included in processing device 1000.

Figure 11:
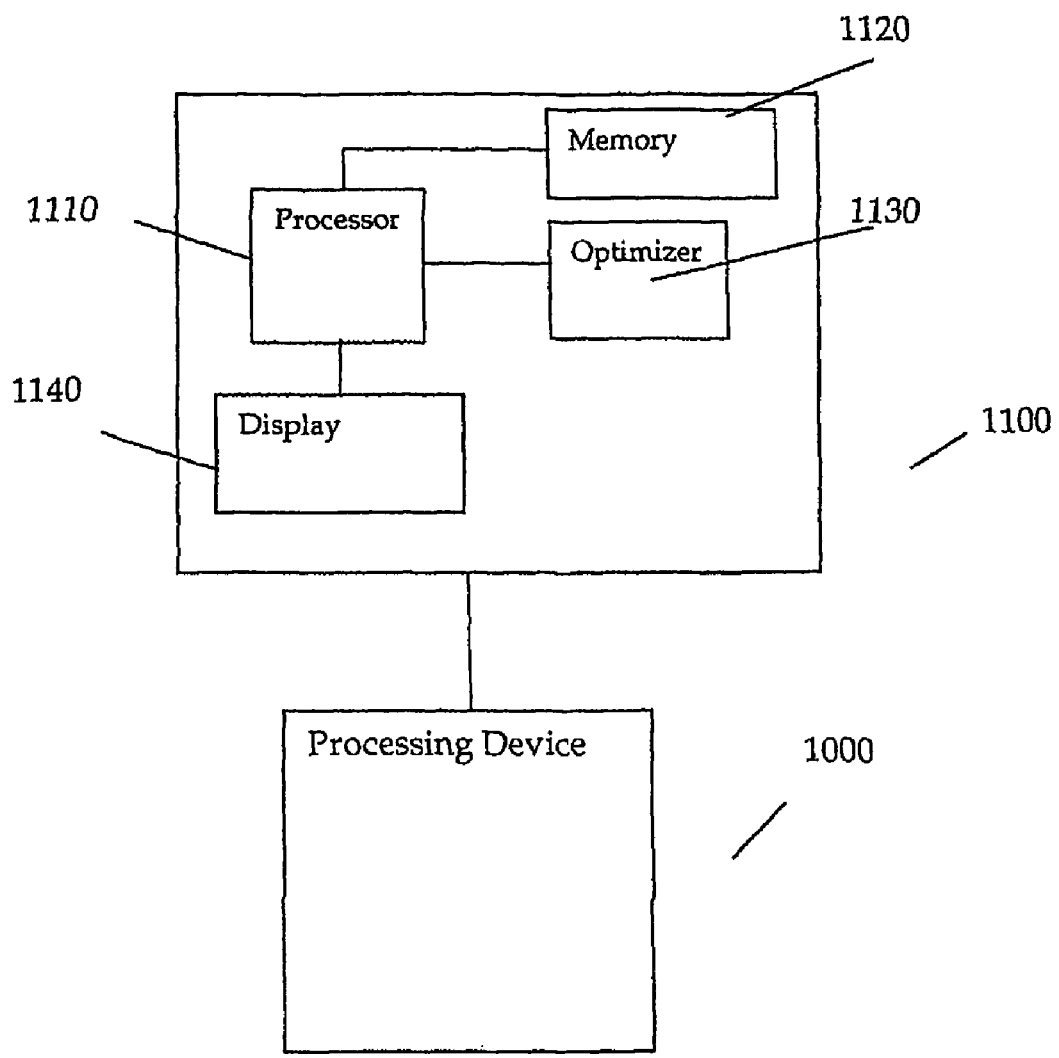
FIG. 11 illustrates an optimizer system for network processors.

FIG. 11 illustrates an optimizer system 1100. Optimizer system 1100 includes a processing device including processor 1110 coupled to memory 1120, display 1140 and optimizer 1130. In one embodiment, optimizer 1130 is a compiler. Display 1140 can be any known type of display device, such as liquid crystal display (LCD), cathode ray tube (CRT), flat screen technology, projection display, etc. Optimizer system further is coupled to processing device 1000 that does not include optimizer 1040. In one embodiment, optimizer system 1100 is removably coupled to processing device 1000. That is, optimizer system can be coupled to processing device 1000 with a cable, through a network, wireless connection, etc. In one embodiment, optimizer 1130 optimizes processing device 1000 by migrating objects from external memory 1010 to local memory (i.e., indexed registers) 1050 using escape analysis and points to analysis in a straightforward way. Computation of the minimal alignments of objects (i.e., variables) in local memory 1050 to maximize sharing of base registers and reduce padding between objects through a forward disjunctive dataflow analysis which takes the code proximity into account. Optimizer 1130 further minimizes costly initialization operations through an existing redundancy elimination algorithm.

Figure 12:
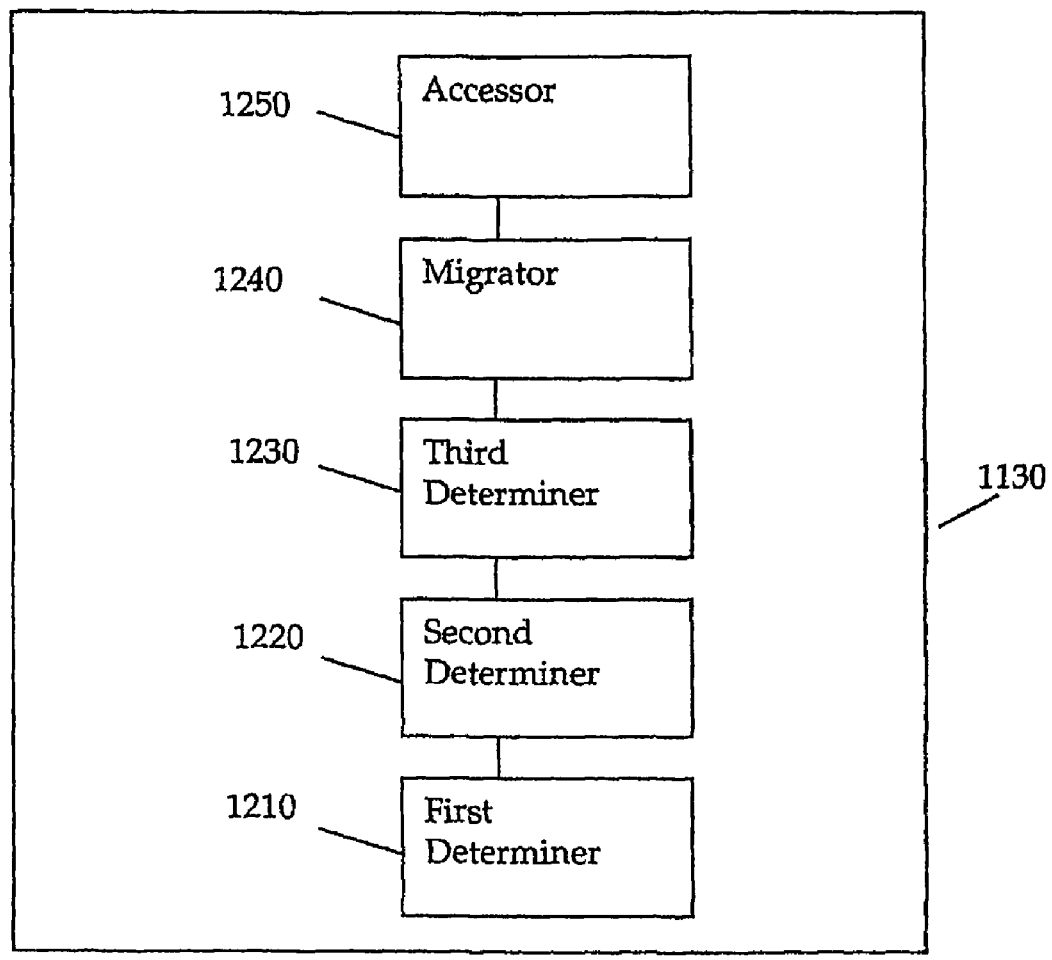
FIG. 12 illustrates a compiler of the embodiment illustrated in FIG. 10.

FIG. 12 illustrates components of optimizer 1130. In one embodiment optimizer 1130 includes first determiner 1210 that determines whether each object (e.g., variable) of a plurality of objects are accessible from more than one processor in a network device. Second determiner 1220 determines an equivalence set of aliased objects in the plurality of objects. Third determiner 1230 determines objects of the plurality of objects eligible for migration. Migrator 1240 changes residence of the objects determined to be eligible for migration. Accessor 1250 changes accesses of the objects having their residence changed. Optimizer 1130 maximizes the sharing of the base-address registers and minimizes the padding between objects in indexed registers 1050 by properly adjusting the alignments of those objects. Together with redundancy elimination, optimizer 1130 minimizes the initializations of the base-address registers.

Embodiments of the present disclosure described herein may be implemented in circuitry, which includes hardwired circuitry, digital circuitry, analog circuitry, programmable circuitry, and so forth. These embodiments may also be implemented in computer programs. Such computer programs may be coded in a high level procedural or object oriented programming language. The program(s), however, can be implemented in assembly or machine language if desired. The language may be compiled or interpreted. Additionally, these techniques may be used in a wide variety of networking environments. Such computer programs may be stored on a storage media or device (e.g., hard disk drive, floppy disk drive, read only memory (ROM), CDROM device, flash memory device, digital versatile disk (DVD), or other storage device) readable by a general or special purpose programmable processing system, for configuring and operating the processing system when the storage media or device is read by the processing system to perform the procedures described herein. Embodiments of the disclosure may also be considered to be implemented as a machine-readable or machine recordable storage medium, configured for use with a processing system, where the storage medium so configured causes the processing system to operate in a specific and predefined manner to perform the functions described herein.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The invention claimed is:

1. A method for optimizing an executable comprising:
   determining a set objects, included in a plurality of objects, eligible for migration by identifying
      objects of the plurality of objects that are not accessible from multiple processors, and
      objects in an equivalence set of aliased objects that does not further include an object that is accessible from multiple processors;
   migrating the set of objects eligible for migration from a first memory to a second memory, wherein migrating includes
      changing residence of the set of objects determined to be eligible for migration, and
      changing accesses of the set of objects having their residence changed;
   determining alignment of the migrated set of objects; and
   eliminating redundant initialization code of the set of objects.

2. The method for optimizing an executable of claim 1, wherein the plurality of objects are variables.

3. The method for optimizing an executable of claim 1, the determining alignment further comprising:
   analyzing the migrated objects by forward disjunctive dataflow analysis;
   determining a minimum alignment necessary for each migrated object; and
   setting the minimum alignment necessary for each migrated object.

4. The method for optimizing an executable of claim 1, wherein the first memory is an external memory and the second memory comprises a plurality of indexed registers residing in a microengine.

5. A processing device comprising:
   an optimizer to determine a set of objects, included in a plurality of objects, eligible for migration by identifying objects of the plurality of objects that are not accessible from multiple network processors, and objects in an equivalence set of aliased objects that does not further include an object that may be accessed by multiple network processors, change location of the set of objects that are determined to be eligible for migration, and migrate the set of objects from an external memory of a network processing device to a plurality of registers coupled to a processor, the optimizer further to align and eliminate redundant initialization code of the set of objects.

6. The processing device of claim 5, wherein the plurality of registers are indexed.

7. The processing device of claim 5, wherein the plurality of objects are variables.

8. The processing device of claim 5, wherein the migrated plurality of objects are not shared by the processor and at least one other processor.

9. The processing device of claim 5, wherein the network processing device is a router.

10. An optimizer system for network processors comprising:
    a processor,
    a first memory coupled to the processor;
    a display coupled to the processor;
    a compiler to migrate a set of objects, included in a plurality of objects, from a second memory to a plurality of indexed registers in a network processor, the compiler further to align and eliminate redundant initialization code of the migrated set of objects;
    a determiner to determine the set of objects eligible for migration by identifying
       objects of the plurality of objects that are not accessible multiple processors in a network device, and
       objects in an equivalence set of aliased objects that does not further include an object that may be accessed by multiple processors in a network device
    a migrator to change residence of the set of objects determined to be eligible for migration; and
    an accessor to change accesses of the set of objects having their residence changed.

11. The optimizer system for network processors of claim 10, wherein the second memory is external to the plurality of processors.

12. The optimizer system for network processors of claim 10, wherein the plurality of objects are variables.

13. The optimizer system for network processors of claim 10, wherein the second memory is external to the plurality of indexed registers.

14. A machine-readable storage medium containing instructions that, when executed, cause a machine to:
    determine a set of variables, included in a plurality of variables, eligible for migration by identifying
       variables of the plurality of variables that are not accessible from multiple network processors; and
       variables in an equivalence set of aliased variables that does not further include a variable that may be accessed by multiple network processors;
    change location of the set of variables that are determined to be eligible for migration;
    migrate the set of variables from a first memory to a plurality of indexed registers;
    align the migrated set of variables; and
    eliminate redundant initializations to a base address register.

15. The machine-readable storage medium of claim 14, further comprising instructions that, when executed, cause a machine to:
    analyze the migrated variables by forward disjunctive dataflow analysis; and determine a minimum alignment necessary for each migrated variable.

16. The machine-readable storage medium of claim 14, further comprising instructions that, when executed, cause a machine to:

set the minimum alignment necessary for each migrated variable.

17. The machine-readable storage medium of claim 14, further comprising instructions that, when executed, cause a machine to:

compile source code to migrate the plurality of variables from the first memory to the plurality of indexed registers.

* * * * *